Jan. 14, 1964  G. W. SHEPHERD, JR  3,117,455
OMNIDIRECTIONAL ACCELEROMETER
Filed July 19, 1961  3 Sheets-Sheet 1

FIG. I

INVENTOR.
GEORGE W. SHEPHERD JR.
BY

ATTORNEY

*INVENTOR.*
GEORGE W. SHEPHERD JR

Jan. 14, 1964   G. W. SHEPHERD, JR   3,117,455
OMNIDIRECTIONAL ACCELEROMETER
Filed July 19, 1961   3 Sheets-Sheet 3

INVENTOR.
GEORGE W. SHEPHERD JR.
BY
ATTORNEY

United States Patent Office 3,117,455
Patented Jan. 14, 1964

3,117,455
OMNIDIRECTIONAL ACCELEROMETER
George W. Shepherd, Jr., Fair Lawn, N.J., assignor to ACF Industries, Incorporated, New York, N.Y., a corporation of New Jersey
Filed July 19, 1961, Ser. No. 125,148
11 Claims. (Cl. 73—492)

This invention relates to an omnidirectional accelerometer for providing a record of the maximum accelerations or shocks occurring in all directions during a journey.

Accelerometers have a wide field of use. A particular application to which the present accelerometer is especially suited is enclosure with articles which are shipped and which are subject to breakage if subjected to excessive forces. The accelerometer is enclosed with the shipment and provides a record of the peak accelerations suffered during transit.

A principal advantage of the present invention is that it provides a single indication of the maximum acceleration in any given direction without computation of vector components.

Another object of the invention is to provide an accelerometer which indicates the peak accelerations or decelerations without any ambiguity.

Still another object of the invention is to indicate maximum accelerations with considerable accuracy and record them uniquely in a tamper-proof manner.

Still another object of the invention is to provide an omnidirectional accelerometer which gives an indelible indication whether a predetermined value of acceleration has been exceeded.

Figure 1:
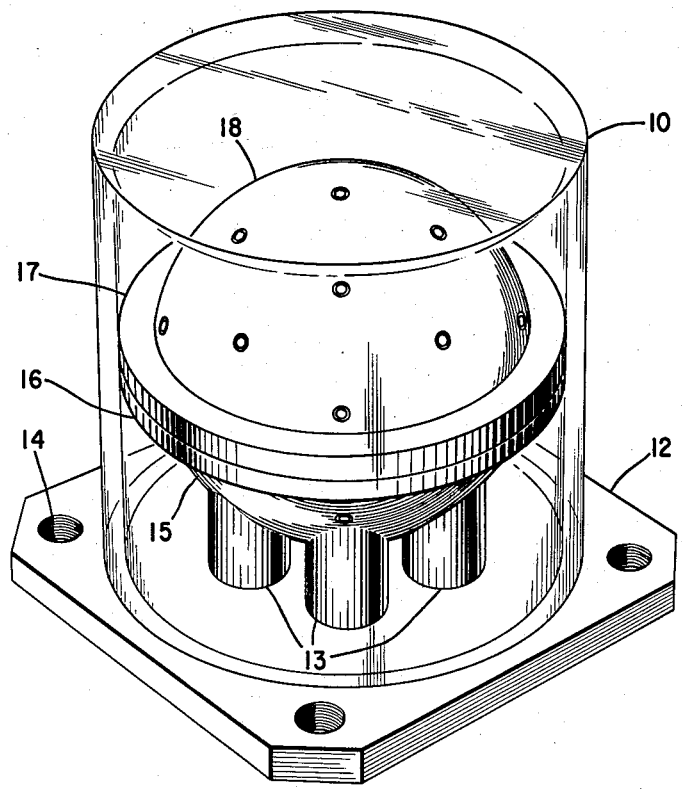
Figure 2:
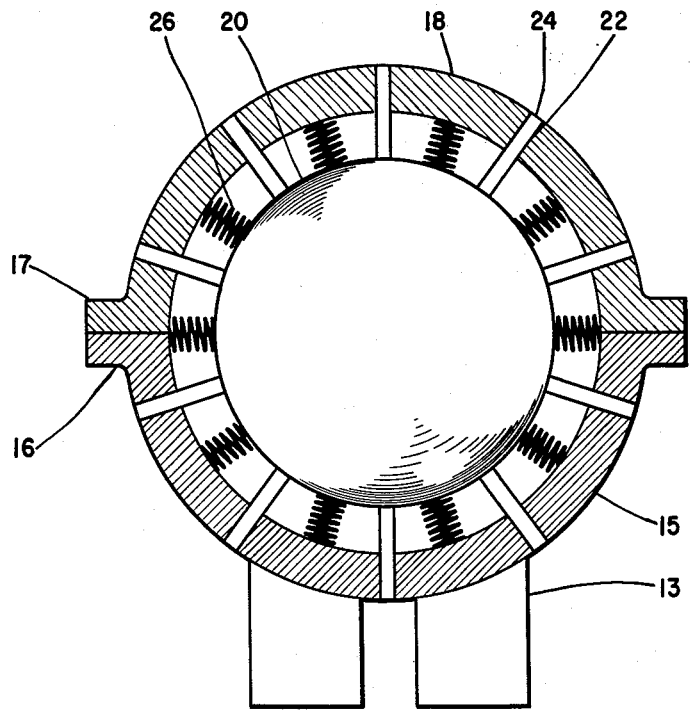
Figure 3:
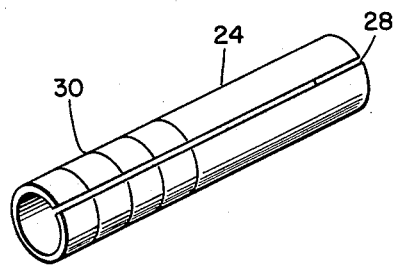
Figure 4:
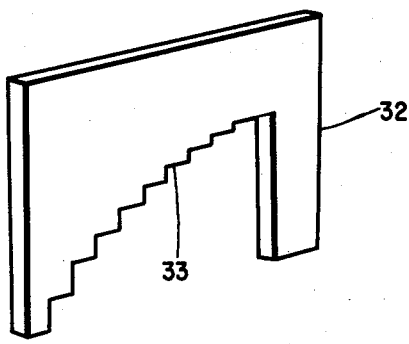
Figure 5:
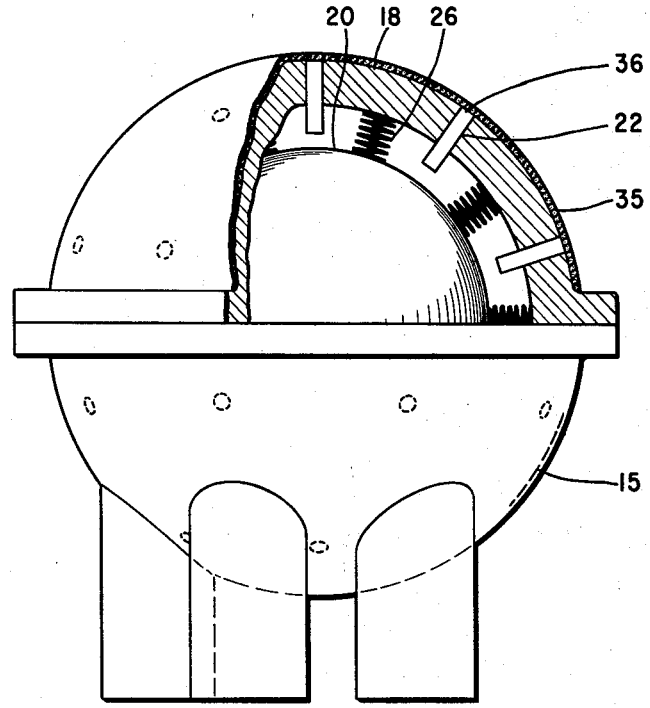

Other objects and advantages of the invention will become apparent from the following description and the accompanying drawing in which:

FIGURE 1 is an isometric view of the accelerometer.
FIGURE 2 is a sectional view of the accelerometer without the housing.
FIGURE 3 shows one of the pins.
FIGURE 4 shows a measuring gauge for use with the accelerometer.
FIGURE 5 is a sectional view of another embodiment of the invention.

Referring to FIGURES 1 through 4 of the drawings, there is shown an accelerometer enclosed in a housing 10 fitting into a base 12 and fastened by a suitable adhesive or screws. The housing may be transparent as shown in FIGURE 1 or opaque. In either case it may be sealed to prevent tampering. The base is provided with mounting holes 14 to enable the device to be fixed inside a shipping container for example. The accelerometer shell is in two halves 15 and 18, each half having a flange 16 and 17, respectively. The two halves are fastened together by a suitable adhesive on the inner surfaces of the flanges 16 and 17. The bottom shell half 15 has five legs 13, only three of which are shown in FIGURE 1, for standing the shell off the base 12. The legs 13 are fastened to the base 12 by screws not shown.

The shell halves 15 and 18 are provided with radial perforations in many directions. There are a sufficient number of these perforations to indicate, with the desired accuracy, every direction on the spherical shell halves 15 and 18. Within the shell there is a ball or spherical weight 20 which serves as the inertial mass as indicated in FIGURE 2. Ball 20 is supported within the shell by a large number of suitable cushioning devices 26 such as springs. For some applications of the invention these springs have a variable spring constant or a dual spring constant for accurately measuring low peak accelerations as well as high values thereof. Springs 26 can be given a variable spring constant in any well-known manner as, for example, making the pitch of the spring variable or by using rubber or other material as a spring. Within perforations 22 there are inserted pins 24 preferably formed as indicated in FIGURE 3. The pins are hollow and have a longitudinal slot 28 and are formed of a suitable plastic or metallic material. The outer surface of the pins are provided with graduations or colored rings or bands 30.

When a given shock is encountered, the ball 20 moves in the direction opposite to the acceleration against the cushioning means or springs 26 a distance corresponding to the maximum value of the acceleration. In doing so, the ball 20 moves at least one of the pins outwardly by a given amount. The resulting extension of the pin beyond the surface of shell half 15 or 18 as measured by the graduations or different colored bands on the pin constitutes a permanent record of the peak acceleration in the direction of that pin. If a more accurate measurement of the extension of the pin is required, the gauge 32 shown in FIGURE 4 is used. In this case, casing 10 is removed and the gauge is set so that the height of the pin above the surface corresponds to one of the steps 33 of the gauge.

Referring to the embodiment shown in FIGURE 5, the accelerometer again includes outer half shells 15 and 18 having radial perforations 22 and an inner metallic or other ball 20 resiliently supported within the half shells 15 and 18 by springs 26. The pins 36 in this embodiment, however, are shortened so that they do not extend into contact with ball 20, but their outer ends are preferably flush with the outer surface of spherical half shells 15 and 18. The outer surface of the half shells are coated and sealed with wax or other plastic material 35. When an acceleration exceeding a determined value corresponding to the spacing between ball 20 and pins 36 is experienced, at least one of the pins is moved beyond the surface of half shells 15 or 18 and dents or breaks the seal 35 at that point. Thus a positive indelible indication is given that an acceleration greater than a safe or prescribed value has been encountered in a given direction. The accelerometer of FIGURE 5, it will be understood, is housed in any suitable manner as, for example, shown in FIGURE 1. The other features of either embodiment of the invention can be incorporated in the other embodiment.

It will now be seen that the illustrated and described embodiments of the invention constitute simple and effective means of indicating shocks or accelerations and it will be evident to those skilled in the art that many variations of these structures may be made within the spirit and scope of my invention as defined in the claims.

I claim:
1. An acceleration indicating device comprising a rigid ball, a spherical shell surrounding said ball and spaced therefrom, means located between said ball and shell for movably supporting said ball in said shell in substantially all directions, said shell having perforations extending radially in various directions, and pins slidably mounted in said perforations and extending into the space between said shell and ball, whereby the amount of outward displacement of a pin indicates the peak acceleration experienced by said device in the direction opposite said pin.

2. A device according to claim 1, wherein said pins are spaced a predetermined distance from said ball to indicate only accelerations above a predetermined value.

3. A device according to claim 2, comprising a coating on the outer surface of said shell adapted to be permanently marred by said pins to provide an ineradicable indication of the displacement of said pins.

4. A device according to claim 1, wherein said pins each include means thereon for indicating the amount of displacement thereof.

5. An acceleration indicator comprising a solid ball, a spherical shell surrounding said ball and spaced therefrom, cushioning means located between said ball and shell for resiliently and movably supporting said ball in said sphere in substantially all directions, said shell having perforations extending therethrough radially in substantially all directions, and pins slidably mounted in said perforations and extending into the space between said shell and ball, whereby the amount of outward displacement of a pin from its initial position indicates the peak acceleration experienced in the direction opposite said pin.

6. A device according to claim 5, wherein said cushioning means include resilient members having a lower modulus of elasticity for smaller compressions than for larger compressions.

7. A device according to claim 5, wherein said cushioning means include a plurality of springs each having a multi-valued spring constant.

8. An acceleration indicating device comprising a rigid circular mass, a circular shell surrounding said mass and spaced therefrom, cushioning means located between said mass and shell for resiliently and movably supporting said mass in said shell in substantially all directions, said shell having perforations extending therethrough radially in various directions, and pins slidably mounted in said perforations and extending into the space between said shell and mass, whereby the displacements of said pins beyond the outer surface of the shell provide a record of the peak accelerations in various directions.

9. An acceleration indicator comprising a solid ball, a spherical shell surrounding said ball and spaced therefrom, spring means located between said ball and shell for resiliently and movably supporting said ball in said sphere in substantially all directions, said shell having perforations extending therethrough radially in various directions, and hollow split pins slidably and frictionally mounted in said perforations and extending into the space between said shell and ball, said pins having means thereon for indicating the displacement thereof.

10. An acceleration indicator comprising a rigid ball, a sealed casing, a spherical shell surrounding said ball and spaced therefrom, cushioning means located between said ball and shell for resiliently and movably supporting said ball in said sphere in substantially all directions, said shell having perforations extending therethrough in various directions, and pins slidably mounted in said perforations and extending into the space between said shell and ball, whereby the amount of displacement of each pin indicates the peak acceleration in the direction opposite that pin.

11. An acceleration indicating device comprising a rigid mass, a shell surrounding said mass and equally spaced therefrom on all sides, cushioning means located between said mass and shell for resiliently and movably supporting said mass in said shell in substantially all directions, said shell having perforation extending radially in various directions, and pins slidably mounted and frictionally held in said perforations and extending into the space between said shell and mass, whereby the amount of displacement of said pins provide a record of the peak accelerations in various directions.

References Cited in the file of this patent

UNITED STATES PATENTS

| 2,881,276 | Mintz | Apr. 7, 1959 |

FOREIGN PATENTS

| 798,648 | France | Mar. 10, 1936 |
| 1,012,387 | France | Apr. 16, 1952 |